(12) United States Patent
He

(10) Patent No.: US 9,140,931 B2
(45) Date of Patent: Sep. 22, 2015

(54) BACKLIGHT MODULE AND LIQUID CRYSTAL DISPLAY DEVICE

(75) Inventor: Hu He, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 199 days.

(21) Appl. No.: 13/512,597

(22) PCT Filed: Apr. 20, 2012

(86) PCT No.: PCT/CN2012/074438
§ 371 (c)(1),
(2), (4) Date: May 29, 2012

(87) PCT Pub. No.: WO2013/155702
PCT Pub. Date: Oct. 24, 2013

(65) Prior Publication Data
US 2013/0278865 A1    Oct. 24, 2013

(30) Foreign Application Priority Data
Apr. 18, 2012  (CN) .......................... 2012 1 0113726

(51) Int. Cl.
*G02F 1/1335*   (2006.01)
*G09F 13/04*    (2006.01)

(52) U.S. Cl.
CPC .... *G02F 1/133611* (2013.01); *G02F 1/133603* (2013.01); *G09F 13/04* (2013.01); *G02F 1/133605* (2013.01); *G02F 1/133608* (2013.01)

(58) Field of Classification Search
CPC ................... G02F 1/133602; G02F 1/133603; G02F 1/133611
USPC ..................................................... 349/61–67
See application file for complete search history.

(56) References Cited

U.S. PATENT DOCUMENTS

| | | | | |
|---|---|---|---|---|
| 7,961,278 B2* | 6/2011 | Ohta et al. | ...................... | 349/64 |
| 8,334,950 B2* | 12/2012 | Hoshi et al. | ..................... | 349/62 |
| 8,491,169 B2* | 7/2013 | Kasai | .............. | 349/61 |
| 2003/0234896 A1* | 12/2003 | Kim | ................................ | 349/65 |
| 2008/0218659 A1* | 9/2008 | Kanaya et al. | .................. | 349/64 |
| 2010/0002169 A1* | 1/2010 | Kuramitsu et al. | ............. | 349/65 |

* cited by examiner

Primary Examiner — Dung Nguyen

(57) ABSTRACT

The present invention relates to a backlight module and a liquid crystal display (LCD) device, and the backlight module comprises: a back plate disposed at the bottom of the backlight module; light emitting diode (LED) light sources disposed on the back plate; and a diffusion plate disposed on a light output surface of the backlight module. There are different distances between the LED light sources disposed in different areas of the back plate and the diffusion plate. By adopting different height of LED light sources in different areas of the back plate, the display quality of the backlight module and the LCD device according to the present invention can be increased.

11 Claims, 2 Drawing Sheets

BACKLIGHT MODULE AND LIQUID CRYSTAL DISPLAY DEVICE

FIELD OF THE INVENTION

The present invention relates to a field of a liquid crystal display (LCD), and more particularly to a backlight module and an LCD device which can increase the display quality.

BACKGROUND OF THE INVENTION

A liquid crystal display (LCD) has been widely applied in various kinds of electric products, and most of the LCDs are backlight type LCD, which comprise an LCD panel and a backlight module. According to different incident positions of light sources, the backlight module can be divided into two types, a side-light type and a direct-light type, so as to provide the backlight sources to the LCD panel.

As shown in FIG. 1, a structural schematic view of a traditional direct-light type backlight module 100 is illustrated in FIG. 1, wherein numeral 101 is a back plate, and numeral 102 is a light emitting diode (LED) light source. The LED light source 102 is evenly distributed on the back plate 101. For human's eye, the brightness perception is weak and the color perception is strong in a center area of a display panel, but the brightness perception is strong and the color perception is weak in side edge areas of a display panel. Hence, when an LCD device adopting the above-mentioned backlight module 100 is used for image display, the user may be feel the brightness is worse in the center area of the display panel, so as to influence the display quality.

As a result, it is necessary to provide a backlight module and an LCD device to solve the problems existing in the conventional technologies.

SUMMARY OF THE INVENTION

The present invention provides a backlight module and a liquid crystal display (LCD) device, which can increase the display quality by adopting different height of LED light source in different areas of the backlight module, so as to solve the technology problem that the display quality of the traditional direct-light type backlight module and LCD device is worse.

The present invention relates to a backlight module, which comprises: a back plate disposed at the bottom of the backlight module; at least two light emitting diode (LED) light sources disposed on the back plate; and a diffusion plate disposed on a light output surface of the backlight module; wherein there are different distances between the LED light sources disposed in different areas of the back plate and the diffusion plate; the distance between the LED light sources in a center area of back plate and the diffusion plate is shorter than the distance between the LED light sources in side edge areas of the back plate and the diffusion plate; and the cross-sectional shape of the back plate is step-shaped, and the number of the steps is greater than one.

The present invention further relates to a backlight module, which comprises: a back plate disposed at the bottom of the backlight module; at least two LED light sources disposed on the back plate; and a diffusion plate disposed on a light output surface of the backlight module; wherein there are different distances between the LED light sources disposed in different areas of the back plate and the diffusion plate.

In the backlight module of the present invention, the distance between the LED light sources in a center area of back plate and the diffusion plate is shorter than the distance between the LED light sources in side edge areas of the back plate and the diffusion plate.

In the backlight module of the present invention, a distribution density of the LED light sources in different areas of the back plate is different.

In the backlight module of the present invention, a distribution density of the LED light sources in the center area of the back plate is greater than a distribution density of the LED light sources in side edge areas of the back plate.

In the backlight module of the present invention, the light source comprises a light emitting chip and a lens for increasing a light emitting angle of the light emitting chip.

In the backlight module of the present invention, the cross-sectional shape of the back plate is step-shaped, and the number of the steps is greater than one.

In the backlight module of the present invention, the inner surface of the back plate is provided with a reflector film.

In the backlight module of the present invention, the diffusion plate is provided with an optical film thereon to improve the light output effect.

The present invention further relates to a liquid crystal display (LCD) device, which comprises: a display panel and a backlight module, the backlight module comprises: a back plate disposed at the bottom of the backlight module; at least two LED light sources disposed on the back plate; and a diffusion plate disposed on a light output surface of the backlight module; wherein there are different distances between the LED light sources disposed in different areas of the back plate and the diffusion plate.

In the LCD device of the present invention, the distance between the LED light sources in a center area of back plate and the diffusion plate is shorter than the distance between the LED light sources in side edge areas of the back plate and the diffusion plate.

In the LCD device of the present invention, a distribution density of the LED light sources in different areas of the back plate is different.

In the LCD device of the present invention, a distribution density of the LED light sources in the center area of the back plate is greater than a distribution density of the LED light sources in side edge areas of the back plate.

In the LCD device of the present invention, the light source comprises a light emitting chip and a lens for increasing a light emitting angle of the light emitting chip.

In the LCD device of the present invention, the cross-sectional shape of the back plate is step-shaped, and the number of the steps is greater than one.

In the LCD device of the present invention, the inner surface of the back plate is provided with a reflector film.

In the LCD device of the present invention, the diffusion plate is provided with an optical film thereon to improve the light output effect.

Hence, the advantages of carrying out the backlight module and the LCD device according to the present invention are described, as follows: by adopting different height of LED light sources in different areas of the backlight module, it can increase the display quality and solve the technology problem that the display quality of the traditional direct-light type backlight module and LCD device is worse.

For above-mention contents of the present invention can be best understood by referring to the following detailed description of the preferred embodiments and the accompanying drawings.

DETAILED DESCRIPTION OF THE PREFERRED EMBODIMENTS

Figure 1:
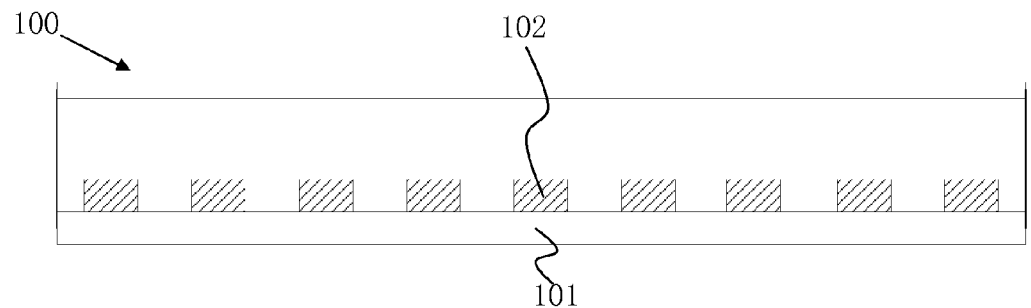
FIG. 1 is a structural schematic view of a direct-light type backlight module of traditional technology.

The description of the preferred embodiments refers to the drawings, so as to illustrate the specific embodiments of the present invention which can be carried out. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, the units with the similar structure use the same numerals.

Figure 2:
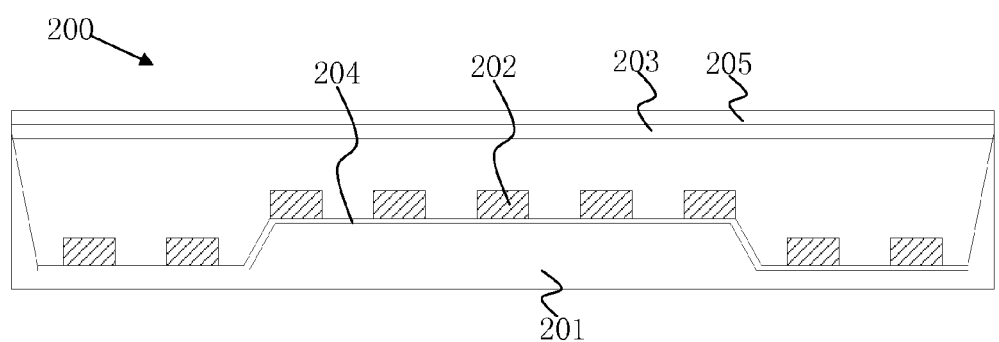
FIG. 2 is a structural schematic view of a backlight module according to a first preferred embodiment of the present invention.

Referring now to FIG. 2, a structural schematic view of a backlight module according to a first preferred embodiment of the present invention is illustrated in FIG. 2. In this embodiment, the backlight module 200 comprises a back plate 201, at least two light emitting diode (LED) light sources 202, a diffusion plate 203, a reflector film 204 and an optical film 205, wherein the back plate 201 is disposed at the bottom of the backlight module 200; the LED light sources 202 are disposed on the back plate 201; the diffusion plate 203 is disposed on the light output surface of the backlight module 200; the reflector film 204 is disposed on the inner surface of the back plate 201; the optical film 205 is disposed on the diffusion plate 203 to improve the light output effect. In this embodiment, there are different distances between the LED light sources 202 disposed in different areas of the back plate 201 and the diffusion plate 203 (i.e. the LED light sources 202 disposed in different areas of back plate 201 have different optical mixing distances). As shown in FIG. 2, the distance between the LED light sources 202 in a center area of back plate 201 and the diffusion plate 203 is shorter than the distance between the LED light sources 202 in side edge areas of the back plate 201 and the diffusion plate 203.

When the backlight module 200 in operation, because the optical mixing distance of the LED light sources 202 in the center area of the back plate 201 is shorter and the optical mixing distances of the LED light sources 202 in the side edge areas of the back plate 201 is larger, the brightness of the center area of the backlight module and corresponding display panel is increased. As shown in FIG. 2, the cross-sectional shape of the back plate 201 can be designed as a step-shape, and the number of the steps is greater than one (the step number is 2 in the figure). Certainly, the cross-sectional shape of the back plate 201 also can be designed as other shapes, such as a triangle, a trapezium, a multiple step-shape, etc., and all of that can be achieved in the backlight module 200 of the present invention.

Figure 3:
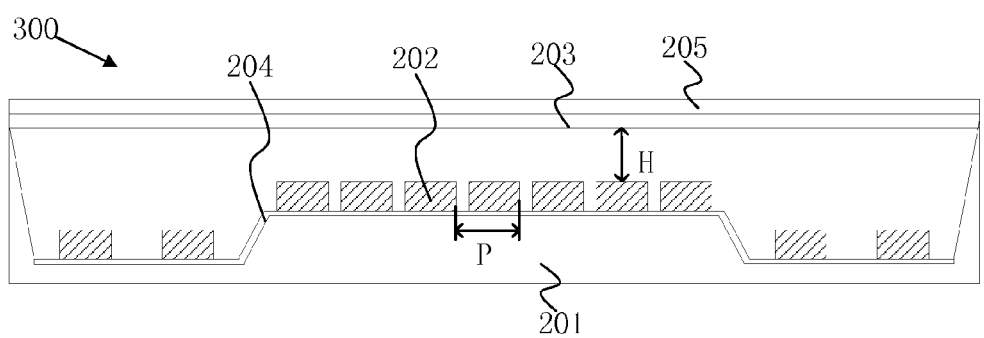
FIG. 3 is a structural schematic view of a backlight module according to a second preferred embodiment of the present invention.

Referring to FIG. 3, a structural schematic view of a backlight module according to a second preferred embodiment of the present invention is illustrated in FIG. 3. It is only described the difference between this embodiment and the first preferred embodiment, and the similarity do not be repeat again. In comparison with the first preferred, a distribution density of the LED light sources 202 in different areas of the back plate is different, too, wherein a distribution density of the LED light sources 202 in the center area of the back plate 201 is greater than a distribution density of the LED light sources 202 in side edge areas of the back plate 201.

In the direct-light type of backlight module 300 of this preferred embodiment, the distance between the light sources 202 of the center area and diffusion plate 203 (i.e. the optical mixing distance of the LED light sources 202) is shorter, so it is easy caused a phenomenon of "Mura". However, when the rate (rate of H/P in FIG. 3) of the optical mixing distance of the LED light sources 202 and the pitch of the LED light sources 202 is increased, the "Mura" phenomenon of the backlight module 300 will be much improved. Hence, when the backlight module 300 is in operation, a distribution density of the LED light sources 202 in the center area of the back plate 201 is greater than a distribution density of the LED light sources 202 in the side edge area of the back plate 201. In another word, it decreases the pitch of the LED light sources 202 in the center area of the back plate 201, and increases the rate H/P. When the LED light sources 201202 is improved in designing height, the "Mura" phenomenon of the center area of the corresponding display panel can be well controlled, too. As shown in FIG. 3, the cross-sectional shape of the back plate 201 can be designed as a step-shape, and the number of steps is greater than one (the steps number is 2 in the figure). Certainly, the cross-sectional shape of the back plate 201 also can be designed as others shapes, such as a triangle, a trapezium, a multiple step-shape, etc., and all of that can be achieved in the backlight module 300 of the present invention.

The LED light sources 202 of the present invention can comprise a light emitting chip and a lens. The lens is used for increase a light emitting angle of the light emitting chip, so the use of the lens can further improve the light emitting uniform of the light emitting chip, so as to increase the display effect of the corresponding display panel. The light emitting chip and the corresponding lens can be form as one-piece or non-one-piece.

The reflector film 204 can be a reflecting film or a reflecting coat layer, which is made of material with high reflectance, and is used for preventing the emitted lights from out of the back plate 201 to influence the light emitting effect of the backlight module. The materials with high reflectance, such as silver, aluminum, gold, chromium, copper, indium, iridium, nickel, platinum, rhenium, rhodium, tin, tantalum, wolfram, manganese, alloy combined by any above-mention, white reflecting paint of yellow-resistant and heat-resistant, or anyone combined by above-mentioned.

The optical film 205 can be a prism sheet, turning prism sheet, brightness enhancement film (BEF), dual brightness enhancement film (DBEF), diffused reflective polarizer film (DRPF) or anyone combined by above-mentioned, and it is disposed on the diffusion plate 203 to improve the light output effect of the backlight module.

The present invention further relates to a liquid crystal display (LCD) device comprising a display panel and a backlight module. The backlight module comprises a back plate, at least two LED light sources, a diffusion plate, a reflector film and an optical film, wherein the back plate is disposed at the bottom of the backlight module; the LED light sources are disposed on the back plate; the diffusion plate is disposed on the light output surface of the backlight module; the reflector film is disposed on the inner surface of the back plate; the optical film is disposed on the diffusion plate to improves the light output effect. In the LCD device according to the present invention, there are different distances between the LED light source disposed in different areas of back plate and the diffusion plate (i.e. the LED light source disposed in different areas of the back plate have different optical mixing distances). The distanced between the LED light sources in the center area of the back plate and the diffusion plate is shorter than the distanced between the LED light source in the side edge areas of the back plate and the diffusion plate. The operation principle and the benefit of the LCD device are the same or similar as the above-mentioned description of the specific embodiment of the backlight module, so please refer to the foregoing specific embodiment of the backlight module.

As above-mentioned description, the advantages of the backlight module and the LCD device according to the present invention are as follows: by adopting different design height in different areas of the backlight module, it can increase the display quality of the backlight module and the LCD device; meanwhile, it can well avoid the "Mura" phenomenon of the backlight module, so as to well solve the technology problem that the display quality is worse.

As described on, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   a back plate disposed at the bottom of the backlight module;
   at least two light emitting diode (LED) light sources disposed on the back plate; and
   a diffusion plate disposed on a light output surface of the backlight module;
   wherein there are different distances between the LED light sources disposed in different areas of the back plate and the diffusion plate, and a distribution density of the LED light sources in different areas of the back plate is different, and the distribution density of the LED light source is changed to improve "Mura" phenomenon;
   wherein the distance between the LED light sources in a center area of back plate and the diffusion plate is shorter than the distance between the LED light sources in side edge areas of the back plate and the diffusion plate;
   wherein the distribution density of the LED light sources in a center area of the back plate is greater than the distribution density of the LED light sources in the side edge areas of the back plate; and
   wherein a cross-sectional shape of the back plate is step-shaped, and the number of steps of the cross-sectional shape is greater than one.

2. A backlight module, comprising:
   a back plate disposed at the bottom of the backlight module;
   at least two LED light sources disposed on the back plate; and
   a diffusion plate disposed on a light output surface of the backlight module;
   wherein there are different distances between the LED light sources disposed in different areas of the back plate and the diffusion plate, and a distribution density of the LED light sources in different areas of the back plate is different, and the distribution density of the LED light source is changed to improve "Mura" phenomenon;
   wherein the distance between the LED light sources in a center area of back plate and the diffusion plate is shorter than the distance between the LED light sources in side edge areas of the back plate and the diffusion plate; and
   wherein the distribution density of the LED light sources in a center area of the back plate is greater than the distribution density of the LED light sources in the side edge areas of the back plate.

3. The backlight module according to claim 2, wherein the light source comprises a light emitting chip and a lens for increasing a light emitting angle of the light emitting chip.

4. The backlight module according to claim 2, wherein the cross-sectional shape of the back plate is step-shaped, and the number of steps of the cross-sectional shape is greater than one.

5. The backlight module according to claim 2, wherein an inner surface of the back plate is provided with a reflector film.

6. The backlight module according to claim 2, wherein the diffusion plate is provided with an optical film thereon to improve a light output effect of the backlight module.

7. A liquid crystal display (LCD) device, comprising:
   a display panel; and
   a backlight module, which comprises:
      a back plate disposed at the bottom of the backlight module;
      at least two LED light sources disposed on the back plate; and
      a diffusion plate disposed on a light output surface of the backlight module;
   wherein there are different distances between the LED light sources disposed in different areas of the back plate and the diffusion plate, and a distribution density of the LED light sources in different areas of the back plate is different, and the distribution density of the LED light source is changed to improve "Mura" phenomenon;
   wherein the distance between the LED light sources in a center area of back plate and the diffusion plate is shorter than the distance between the LED light sources in side edge areas of the back plate and the diffusion plate; and
   wherein the distribution density of the LED light sources in a center area of the back plate is greater than the distribution density of the LED light sources in the side edge areas of the back plate.

8. The LCD device according to claim 7, wherein the light source comprises a light emitting chip and a lens for increasing a light emitting angle of the light emitting chip.

9. The LCD device according to claim 7, wherein the cross-sectional shape of the back plate is step-shaped, and the number of steps of the cross-sectional shape is greater than one.

10. The LCD device according to claim 7, wherein an inner surface of the back plate is provided with a reflector film.

11. The LCD device according to claim 7, wherein the diffusion plate is provided with an optical film thereon to improve a light output effect of the backlight module.

* * * * *